US012655823B2

(12) United States Patent
Razeghi

(10) Patent No.: US 12,655,823 B2
(45) Date of Patent: Jun. 16, 2026

(54) SEGMENTED WIND TURBINE BLADE WITH SPAR CAPS

(71) Applicant: LM WIND POWER A/S, Kolding (DK)

(72) Inventor: Rama Razeghi, Eastleigh (GB)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/687,457

(22) PCT Filed: Oct. 24, 2022

(86) PCT No.: PCT/EP2022/079518
§ 371 (c)(1),
(2) Date: Feb. 28, 2024

(87) PCT Pub. No.: WO2023/072800
PCT Pub. Date: May 4, 2023

(65) Prior Publication Data
US 2024/0352917 A1      Oct. 24, 2024

(30) Foreign Application Priority Data
Oct. 27, 2021    (EP) .................................... 21204984

(51) Int. Cl.
*F03D 1/06* (2006.01)

(52) U.S. Cl.
CPC ......... *F03D 1/0677* (2023.08); *F03D 1/0681* (2023.08); *F05B 2230/23* (2013.01); *F05B 2240/302* (2013.01)

(58) Field of Classification Search
CPC .... F03D 1/0677; F03D 1/0681; F03D 1/0675; F05B 2230/23; F05B 2240/302; Y02E 10/72
See application file for complete search history.

(56) References Cited

U.S. PATENT DOCUMENTS 5,281,454 A  *  1/1994  Hanson ............... B29C 66/1162
                                                                    138/155
7,922,454 B1     4/2011  Riddell
                    (Continued)

FOREIGN PATENT DOCUMENTS

| WO |  | 2020086080 A1 | 4/2020 | |
|---|---|---|---|---|
| WO |  | WO-2020089074 A1 * | 5/2020 | ......... B29D 99/0028 |
| WO |  | 2021219198 A1 | 11/2021 | |

*Primary Examiner* — Nathaniel E Wiehe
*Assistant Examiner* — Wayne A Lambert
(74) *Attorney, Agent, or Firm* — Dority & Manning, P.A.

(57) ABSTRACT

The present disclosure relates to a method for manufacturing a blade segment for a segmented wind turbine blade, and a resulting segment for a segmented wind turbine blade as well as the segmented wind turbine blade. In particular, the blade segment comprises a female spar part defining an inner cavity and having a longitudinal inner end and an opposite longitudinal open end towards an end face of the blade segment, a first spar cap connected to an inner surface of a first shell portion and comprising a first primary spar cap portion. The blade segment further comprises a first secondary spar cap portion affixed to a first outer surface of the female spar part. The first secondary spar cap portion is glued to the inner surface of the first shell portion and/or to the first primary spar cap portion forming a glue interface between the first secondary spar cap portion and the inner surface of the first shell portion and/or the first primary spar cap portion.

13 Claims, 6 Drawing Sheets

(56) References Cited

U.S. PATENT DOCUMENTS

| | | | | |
|---|---|---|---|---|
| 8,517,689 B2* | 8/2013 | Kyriakides | ........... | F03D 1/0675 |
| | | | | 416/226 |
| 8,764,401 B2* | 7/2014 | Hayden | ................. | F03D 1/0633 |
| | | | | 416/224 |
| 8,918,997 B2* | 12/2014 | Kyriakides | ............ | F03D 13/10 |
| | | | | 29/889.7 |
| 9,283,726 B2* | 3/2016 | Obrecht | ............... | B29C 70/546 |
| 9,617,973 B2* | 4/2017 | Stege | ................... | F03D 1/0675 |
| 9,745,956 B2* | 8/2017 | Johnson | ............... | F03D 1/0658 |
| 9,897,065 B2* | 2/2018 | Caruso | .................... | B23P 15/04 |
| 10,451,030 B2* | 10/2019 | Hayden | ................... | B29C 70/00 |
| 2009/0155084 A1* | 6/2009 | Livingston | ........... | B29C 66/543 |
| | | | | 416/223 R |
| 2009/0162206 A1* | 6/2009 | Zirin | .................... | F03D 1/0675 |
| | | | | 416/223 R |
| 2009/0162208 A1* | 6/2009 | Zirin | .................... | F03D 1/0675 |
| | | | | 29/889.7 |
| 2010/0132884 A1* | 6/2010 | Baehmann | .......... | B29C 66/1142 |
| | | | | 156/423 |
| 2010/0135815 A1* | 6/2010 | Bagepalli | ............. | F03D 1/0675 |
| | | | | 416/241 R |
| 2012/0027612 A1* | 2/2012 | Yarbrough | ........... | F03D 1/0675 |
| | | | | 416/226 |
| 2018/0051672 A1* | 2/2018 | Merzhaeuser | .......... | F03D 13/10 |
| 2020/0080542 A1* | 3/2020 | Monie | ................... | B29C 66/524 |
| 2022/0018327 A1* | 1/2022 | Roberts | ............. | B29D 99/0028 |

* cited by examiner

SEGMENTED WIND TURBINE BLADE WITH SPAR CAPS

This is a National Phase Application filed under 35 U.S.C. 371 as a national stage of PCT/EP2022/079518, filed Oct. 24, 2022, an application claiming the benefit of European Application No. 21204984.5, filed Oct. 27, 2021, the content of each of which is hereby incorporated by reference in its entirety.

The present disclosure relates generally to segmented wind turbine blades comprising a first blade segment and a second blade segment. Particularly, wherein the first blade segment comprises a female spar part and the second blade segment comprises a male spar part received in a cavity of the female spar part. More particularly, the present disclosure relates to the interface and/or joining of spar parts within their respective blade segment, more particularly of the female spar part within the first blade segment.

BACKGROUND

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of fabric or fibre and resin. Spar caps (also denoted main laminates) are placed or integrated in the shell halves and may be combined with shear webs or spar beams to form structural support members. Spar caps may be joined to, or integrated within, the inside of the suction side and pressure side halves of the blade shell.

As the size of wind turbines increases, the manufacturing and transporting of wind turbine blades becomes more challenging and costly. To address this, it is known to provide a wind turbine blade in two or more segments. This may result in an easier manufacturing process and may reduce the cost of transportation and erection of wind turbines. The blade segments may, e.g. individually, be transported to the erection site where they can be assembled to form the wind turbine blade.

However, several challenges are associated with such design, relating to the manufacturing and joining of the blade segments including load bearing structures such as spar caps, shear webs or other internal components. Problems may arise in obtaining the desired slim shape of the airfoil region of the blade and the desired and necessary strength of the segmented blade in the connection area between, e.g., a female spar part of the first blade segment and a male spar part of the second blade segment.

SUMMARY

It is an object of the present disclosure to provide solutions for a segmented wind turbine blade eliminating, reducing or at least providing alternative solutions to the above problems. Particularly it is an object of the present disclosure to provide a segmented wind turbine blade where the structure of the connection area has the desired and necessary strength with no or minimal impact on the blade performance, such as aerodynamic properties.

Thus, the present disclosure relates to a method for manufacturing a blade segment for a segmented wind turbine blade, and a resulting segment for a segmented wind turbine blade as well as the segmented wind turbine blade.

Accordingly, a method for manufacturing a first blade segment is disclosed with a female spar part for receiving a protruding portion of a male spar part of a second blade segment for connection with the first blade segment at a chordwise joint for forming a segmented wind turbine blade having a profiled contour including a pressure side and a suction side, and a leading edge and a trailing edge with a chord extending therebetween defining a chordwise direction, the segmented wind turbine blade extending in a longitudinal direction between a root end and a tip end.

The method comprises assembling a first shell portion (e.g. a pressure side shell portion) and a first primary spar cap portion of a first spar cap, and infusing the first shell portion and the first primary spar cap portion with a resin connecting the first primary spar cap portion to an inner surface of the first shell portion. The method further comprising providing the female spar part defining an inner cavity and having a longitudinal inner end and an opposite longitudinal open end, and affixing a first secondary spar cap portion to a first outer surface of the female spar part.

The method further comprises, after infusing the first shell portion and the first primary spar cap portion, supplying glue to the inner surface of the first shell portion, to the first primary spar cap and/or to the first secondary spar cap portion, and, after supplying the glue, arranging the first shell portion and the female spar part with the affixed first secondary spar cap portion. For example, the female spar part with the affixed first secondary spar cap portion may be arranged inside the first shell portion. The first shell portion and the female spar part is arranged such that the longitudinal open end of the female spar part is arranged towards an end face of the first blade segment, and such that the first secondary spar cap portion is glued, such as connected by gluing, to the inner surface of the first shell portion and/or to the first primary spar cap forming a glue interface between the first secondary spar cap portion and the inner surface of the first shell portion and/or the first primary spar cap.

The method may further comprise assembling a second shell portion and a second primary spar cap portion of a second spar cap, and infusing the second shell portion and the second primary spar cap portion with a resin connecting the second primary spar cap portion to an inner surface of the second shell portion. The first shell portion with the first primary spar cap portion and the second shell portion with the second primary spar cap portion may be arranged and bonded such as to form the first blade segment.

Also, a first blade segment for a segmented wind turbine blade is disclosed. The disclosed first blade segment may be the first blade segment resulting from the disclosed method. The first blade segment is for a segmented wind turbine blade. The first blade segment has a profiled contour including a pressure side and a suction side, and a leading edge and a trailing edge with a chord extending therebetween defining a chordwise direction. The first blade segment extends in a longitudinal direction (e.g. coinciding with the longitudinal direction of the resulting segmented wind turbine blade) between a first end and a second end.

The first blade segment comprises a female spar part defining an inner cavity and having a longitudinal inner end and an opposite longitudinal open end towards an end face of the first blade segment. The female spar part is adapted to receive a protruding portion of a male spar part of a second blade segment for connection with the first blade segment at a chordwise joint for forming the segmented wind turbine blade. In some examples the first blade segment and the second blade segment may be connected to one or more further blade segments to form the segmented wind turbine blade.

The first blade segment further comprises a first spar cap connected to an inner surface of a first shell portion (e.g. a pressure side shell portion) of the first blade segment and extending longitudinally over at least a majority of the extent of the first blade segment. The first spar cap comprises a first primary spar cap portion. The first blade segment further may comprise a second spar cap connected to an inner surface of a second shell portion (e.g. a suction side shell portion) of the first blade segment, and extending longitudinally over at least a majority of the extent of the first blade segment. The second spar cap comprises a second primary spar cap portion.

The first blade segment further comprises a first secondary spar cap portion. The first secondary spar cap portion is affixed to a first outer surface of the female spar part. The first secondary spar cap portion extends longitudinally from a first end to an opposite second end arranged near the end face of the first blade segment. The first secondary spar cap portion is glued to the inner surface of the first shell portion and/or to the first primary spar cap portion forming a glue interface between the first secondary spar cap portion and the inner surface of the first shell portion and/or the first primary spar cap portion.

Also a segmented wind turbine blade is disclosed. The segmented wind turbine blade has a profiled contour including a pressure side and a suction side, and a leading edge and a trailing edge with a chord extending therebetween defining a chordwise direction. The segmented wind turbine blade extends in a longitudinal direction between a root end and a tip end.

The segmented wind turbine blade comprises a first blade segment. The first blade segment of the disclosed segmented wind turbine blade may be the first blade segment as separately described above, e.g. the first blade segment of the segmented wind turbine blade may be the first blade segment resulting from the disclosed method. The first blade segment comprises a female spar part defining an inner cavity and having a longitudinal inner end and an opposite longitudinal open end towards an end face of the first blade segment.

The segmented wind turbine blade may comprise a second blade segment connected to the first blade segment at a chordwise joint and comprising a male spar part having a protruding portion protruding at the joint from an end face of the second blade segment and extending through the longitudinal open end of the female spart part and into the cavity of the female spar part.

The segmented wind turbine blade may comprise a locking mechanism mutually locking together the female spar part and the male spar part and thereby the first blade segment and the second blade segment. The locking mechanism may comprise a pin joint wherein a pin is extending, e.g. in a direction perpendicular to the longitudinal direction, through openings in the female and male spar parts. However, other means known in the art for restricting movement between the female and male spar parts may be used equivalently.

A second secondary spar cap portion, e.g. similar or substantially similar to the first secondary spar cap portion, may be affixed to a second outer surface of the female spar part. The second outer surface may be opposite the first outer surface of the female spar part. The second secondary spar cap portion may extend longitudinally from a first end to an opposite second end arranged near the end face of the first blade segment.

Glue may be supplied to an inner surface of the second shell portion, to the second primary spar cap portion and/or to the second secondary spar cap portion, e.g. after infusing the second shell portion and the second primary spar cap portion with resin. After supplying the glue, the second shell portion with the second primary spar cap and the female spar part with the affixed second secondary spar cap portion may be arranged such that the second secondary spar cap portion is glued to the inner surface of the second shell portion and/or to the second primary spar cap forming a glue interface between the second secondary spar cap portion and the inner surface of the second shell portion and/or the second primary spar cap. Thus, the second secondary spar cap portion may be glued to the inner surface of the second shell portion and/or to the second primary spar cap portion forming a glue interface between the second secondary spar cap portion and the inner surface of the second shell portion and/or the second primary spar cap portion. Arranging the second shell portion with the second primary spar cap and the female spar part with the affixed second secondary spar cap portion, may include arranging the second shell portion upside down and onto the first shell portion such as to form the first blade segment.

In the present disclosure, the secondary spar cap portions (i.e. the first secondary spar cap portion and/or the second secondary spar cap portion) are affixed to respective outer surfaces of the female spar part prior to connecting the secondary spar cap portions to the remainder of the blade segment. Thereby, the affixing between the female spart part and the secondary spar cap portions can be better controlled and quality checked, thereby improving overall quality and reducing risk of failures.

Furthermore, since the final placement of the female spar part is provided (at least on one side) during closing of the mould, the connection interface created during closure of the mould is less controllable. With the present disclosure, this less controllable connection interface with the shell portions, i.e. the glue interface between the inner shell surface(s) and/or primary spar cap portions (i.e. the first primary spar cap portion and/or the second primary spar cap portion) and the secondary spar cap portions, are provided closer to the surface of the blade segment, thereby allowing for easier access in case repair is needed, i.e. less amount of material needs to be removed to get to the less controllable interface, and perhaps even more importantly, implications on load bearing structures, such as the spar cap or spar cap portions, during such removal of material, is limited.

Affixing the first secondary spar cap portion to the first outer surface of the female spar part and/or affixing the second secondary spar cap portion to the second outer surface of the female spar part may be provided by infusion of resin, e.g. in a vacuum assisted resin transfer moulding process (VARTM). Alternatively, the first secondary spar cap portion may be affixed to the first outer surface of the female spar part and/or the second secondary spar cap portion may be affixed to the second outer surface of the female spar part, by use of adhesives, such as glue, or by other suitable methods for affixing generally known in the art.

The first blade segment may comprise the root end of the segmented wind turbine blade. The first blade segment may be a root end segment of the segmented wind turbine blade. The second blade segment may comprise the tip end of the segmented wind turbine blade. The second blade segment may be a tip end segment of the segmented wind turbine blade. However, in other examples, the first blade segment may be the tip end segment and/or the second blade segment may be the root end segment of the segmented wind turbine blade.

Each of the primary spar cap portions extends longitudinally from a respective first end to an opposite respective second end arranged near the female spar part. Accordingly, the first primary spar cap portion extends longitudinally from a first end to an opposite second end arranged near the female spar part. The second primary spar cap portion extends longitudinally from a first end to an opposite second end arranged near the female spar part.

A chordwise width of the first primary spar cap portion, e.g. at its second end, may be less than a chordwise width of the first secondary spar cap portion, e.g. at its second end. A chordwise width of the second primary spar cap portion, e.g. at its second end, may be less than a chordwise width of the second secondary spar cap portion, e.g. at its second end. By making the chordwise width of the secondary spar cap portions wider than the width of the primary spar cap portions, the secondary spar cap portions may provide the necessary mechanical strength while being thinner than the primary spar cap portions.

The thickness of the primary spar cap portions may decrease along the longitudinal direction in a transition area from an intermediate position to the second end of the respective primary spar cap portion. For example, the thickness of the first primary spar cap portion may decrease along the longitudinal direction in a transition area of the first primary spar cap portion from an intermediate position to the second end of the first primary spar cap portion. Additionally or alternatively, the thickness of the second primary spar cap portion may decrease along the longitudinal direction in a transition area of the second primary spar cap portion from an intermediate position to the second end of the second primary spar cap portion. The thickness of the first primary spar cap portion, e.g. at its intermediate position, may be more than a thickness of the first secondary spar cap portion, e.g. at its first end and/or at its second end. The thickness of the second primary spar cap portion, e.g. at its intermediate position, may be more than a thickness of the second secondary spar cap portion, e.g. at its first end and/or at its second end.

The thickness of the secondary spar cap portion(s) (e.g. the first secondary spar cap portion and/or the second secondary spar cap portion) may be substantially uniform along the longitudinal direction. However, alternatively, the thickness of the secondary spar cap portion(s) may be increasing along the longitudinal direction in a transition area of the respective secondary spar cap portion, e.g. from the first end to an intermediate position of the respective secondary spar cap portion. Alternatively, or additionally, the thickness of the secondary spar cap portion(s) may be decreasing along the longitudinal direction in a second transition area of the respective secondary spar cap portion, e.g. from a second intermediate position to the second end of the respective secondary spar cap portion. Accordingly, the thickness of the first secondary spar cap portion may be increasing along the longitudinal direction in a transition area of the first secondary spar cap portion, e.g. from the first end to an intermediate position of the first secondary spar cap portion. Alternatively, or additionally, the thickness of the first secondary spar cap portion may be decreasing along the longitudinal direction in a second transition area of the first secondary spar cap portion, e.g. from a second intermediate position to the first end of the first secondary spar cap portion. The thickness of the second secondary spar cap portion may be increasing along the longitudinal direction in a transition area of the second secondary spar cap portion from the first end to an intermediate position of the second secondary spar cap portion. Alternatively, or additionally, the thickness of the second secondary spar cap portion may be decreasing along the longitudinal direction in a second transition area of the second secondary spar cap portion, e.g. from a second intermediate position to the first end of the second secondary spar cap portion. The thickness of the secondary spar cap portion(s) may be substantially uniform along the longitudinal direction from the intermediate position to the second end, and/or from the intermediate position to the second intermediate position, and/or from the first end to the second intermediate position.

The transition areas of the secondary spar cap portions and the primary spar cap portions may be aligned, such as to form a scarf joint therebetween. The intermediate position of the first secondary spar cap portion may be longitudinally aligned with the second end of the first primary spar cap portion. The intermediate position of the second secondary spar cap portion may be longitudinally aligned with the second end of the second primary spar cap portion. In some examples, the intermediate position of the first primary spar cap portion may be longitudinally aligned with the first end of the first secondary spar cap portion and/or the intermediate position of the second primary spar cap portion may be longitudinally aligned with the first end of the second secondary spar cap portion.

The secondary spar cap portion(s) may have a varying thickness along the chordwise direction, e.g. at certain longitudinal positions. For example, the first secondary spar cap portion at a longitudinal position (e.g. at the first end, at the second end and/or at an intermediate position between the first end and the second end) of the first secondary spar cap portion may be thicker between a first edge to a first midpoint along the chordwise direction and between a second edge and a second midpoint along the chordwise direction than between the first midpoint and the second midpoint. The second secondary spar cap portion at a longitudinal position (e.g. at the first end, at the second end and/or at an intermediate position between the first end and the second end) of the second secondary spar cap portion may be thicker between a first edge to a first midpoint along the chordwise direction and between a second edge and a second midpoint along the chordwise direction than between the first midpoint and the second midpoint.

During assembly of the first shell portion and the first primary spar cap portion, also a first tertiary spar cap portion and/or a first quaternary spar cap portion may be included. Thus, the method may comprise assembling the first shell portion, the first primary spar cap portion, the first tertiary spar cap portion, and the first quaternary spar cap portion. The first spar cap may comprise the first tertiary spar cap portion and the first quaternary spar cap portion. The first primary spar cap portion may, in the chordwise direction, be arranged between the first tertiary spar cap portion and the first quaternary spar cap portion. Each of the first tertiary spar cap portion and the first quaternary spar cap portion may extend longitudinally from a respective first end to an opposite second end arranged near the female spar part. The second ends of the first primary spar cap portion, the first tertiary spar cap portion and the first quaternary spar cap portion may be longitudinally aligned. The first primary spar cap portion may be longer than each of the first tertiary spar cap portion and the first quaternary spar cap portion.

Infusing the first shell portion and the first primary spar cap portion with a resin may include also infusing the first tertiary spar cap portion and the first quaternary spar cap portion with the resin connecting also the first tertiary spar cap portion, and the first quaternary spar cap portion to the inner surface of the first shell portion. Thus, the method may comprise infusing the first shell portion, the first primary spar cap portion, the first tertiary spar cap portion, and the first quaternary spar cap portion with the resin connecting the first primary spar cap portion, the first tertiary spar cap portion, and the first quaternary spar cap portion to the inner surface of the first shell portion.

The first shell portion and the female spar part with the affixed first secondary spar cap portion may be arranged such that the first secondary spar cap portion is glued to the first tertiary spar cap portion and/or the first quaternary spar cap portion forming a glue interface between the first secondary spar cap portion and the first tertiary spar cap portion and/or the first quaternary spar cap portion. The glue interface between the first secondary spar cap portion and the first tertiary spar cap portion and/or the first quaternary spar cap portion may be in addition or form part of the same glue interface as the glue interface between the first secondary spar cap portion and the inner surface of the first shell portion and/or the first primary spar cap.

During assembly of the second shell portion and the second primary spar cap portion, also a second tertiary spar cap portion and/or a second quaternary spar cap portion may be included. Thus, the method may comprise assembling the second shell portion, the second primary spar cap portion, the second tertiary spar cap portion, and the second quaternary spar cap portion. The second spar cap may comprise the second tertiary spar cap portion and the second quaternary spar cap portion. The second primary spar cap portion may, in the chordwise direction, be arranged between the second tertiary spar cap portion and the second quaternary spar cap portion. Each of the second tertiary spar cap portion and the second quaternary spar cap portion may extend longitudinally from a respective first end to an opposite second end arranged near the female spar part. The second ends of the second primary spar cap portion, the second tertiary spar cap portion and the second quaternary spar cap portion may be longitudinally aligned. The second primary spar cap portion may be longer than each of the second tertiary spar cap portion and the second quaternary spar cap portion.

Infusing the second shell portion and the second primary spar cap portion with a resin may include also infusing the second tertiary spar cap portion and the second quaternary spar cap portion with the resin connecting also the second tertiary spar cap portion, and the second quaternary spar cap portion to the inner surface of the second shell portion. Thus, the method may comprise infusing the second shell portion, the second primary spar cap portion, the second tertiary spar cap portion, and the second quaternary spar cap portion with the resin connecting the second primary spar cap portion, the second tertiary spar cap portion, and the second quaternary spar cap portion to the inner surface of the second shell portion.

The second shell portion and the female spar part with the affixed second secondary spar cap portion may be arranged such that the second secondary spar cap portion is glued to the second tertiary spar cap portion and/or the second quaternary spar cap portion forming a glue interface between the second secondary spar cap portion and the second tertiary spar cap portion and/or the second quaternary spar cap portion. The glue interface between the second secondary spar cap portion and the second tertiary spar cap portion and/or the second quaternary spar cap portion may be in addition or form part of the same glue interface as the glue interface between the second secondary spar cap portion and the inner surface of the second shell portion and/or the second primary spar cap.

Assembly of the first shell portion and the first primary spar cap portion, and optionally the first tertiary spar cap portion and/or the first quaternary spar cap portion, may be performed in a first blade shell mould. The method may comprise providing the first blade shell mould. Similarly, assembly of the second shell portion and the second primary spar cap portion, and optionally the second tertiary spar cap portion and/or the second quaternary spar cap portion, may be performed in a second blade shell mould. The method may comprise providing the second blade shell mould.

The first primary spar cap portion and/or the second primary spar cap portion may be made from a plurality of pultruded elements, such as pultruded carbon fibre elements. The first tertiary spar cap portion, the first quaternary spar cap portion, the second tertiary spar cap portion, and/or the second quaternary spar cap portion may be made from one or more, such as a plurality of, pultruded elements, such as pultruded carbon fibre elements. The pultruded elements may be planks, which may be arranged side by side and/or layered on top of each other. Each individual pultruded element may have a width in the chordwise direction of approximately 100 mm. Each individual pultruded element may have a thickness of approximately 5 mm. The secondary spar cap portion(s), such as the first secondary spar cap portion and/or the second secondary spar cap portion, may be made comprise a plurality of fibre layers. The plurality of fibre layers may comprise glass fibre, carbon fibre or a mixture of glass fibre and carbon fibre. In some examples, the fibre layers of the secondary spar cap portion(s) may essentially consists of glass fibre, carbon fibre or a mixture of glass fibre and carbon fibre. For example, the fibre layers of the secondary spar cap portion(s) may comprise more than 95% glass fibre, carbon fibre or a mixture of glass fibre and carbon fibre. Each of the secondary spar cap portions may comprise between 5 and 15, such as between 10 and 15 fibre layers.

Throughout the present disclosure, the first shell portion may be a pressure side shell portion and the second shell portion may be a suction side shell portion. Alternatively, the first shell portion may be the suction side shell portion and the second shell portion may be the pressure side shell portion. Similarly, the first spar cap may be a pressure side spar cap and the second spar cap may be a suction side spar cap. Alternatively, the first spar cap may be the suction side spar cap and the second spar cap may be the pressure side spar cap.

Throughout the present disclosure when referring to infusion of resin, such infusion may be done by vacuum assisted resin transfer moulding (VARTM).

Generally, when nothing else is defined, lengths are in the longitudinal direction, widths are in the chordwise direction, and thickness are in a thickness direction perpendicular to the longitudinal and chordwise directions.

BRIEF DESCRIPTION OF THE FIGURES

Embodiments of the disclosure will be described in more detail in the following with regard to the accompanying figures. The figures show one way of implementing the present disclosure and are not to be construed as being limiting to other possible embodiments falling within the scope of the attached claim set.

DETAILED DESCRIPTION

Figure 1:
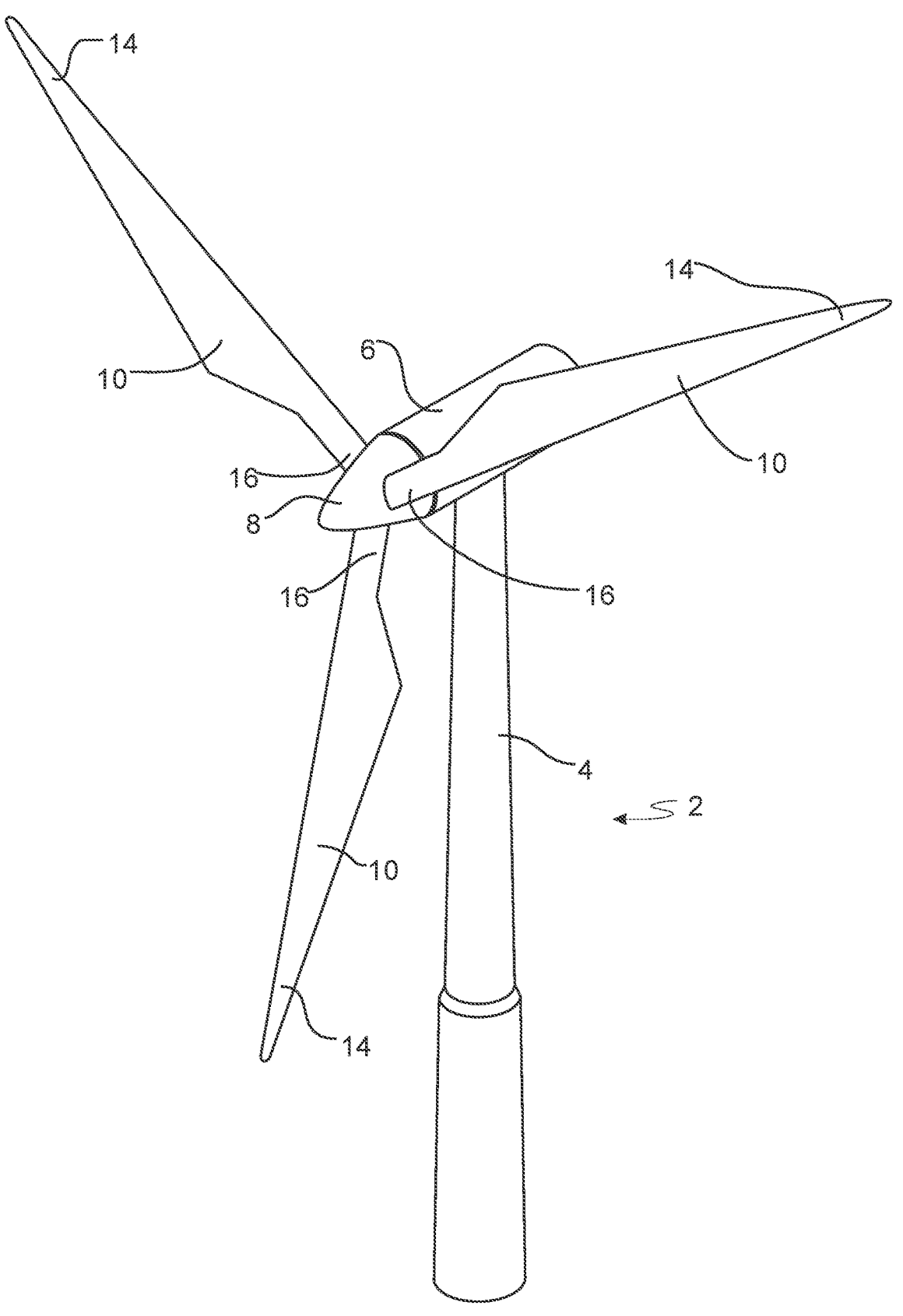
FIG. 1 illustrates an exemplary wind turbine.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates an exemplary wind turbine 2, such as a conventional modern upwind wind turbine according to the so-called "Danish concept". The wind turbine 2 has a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
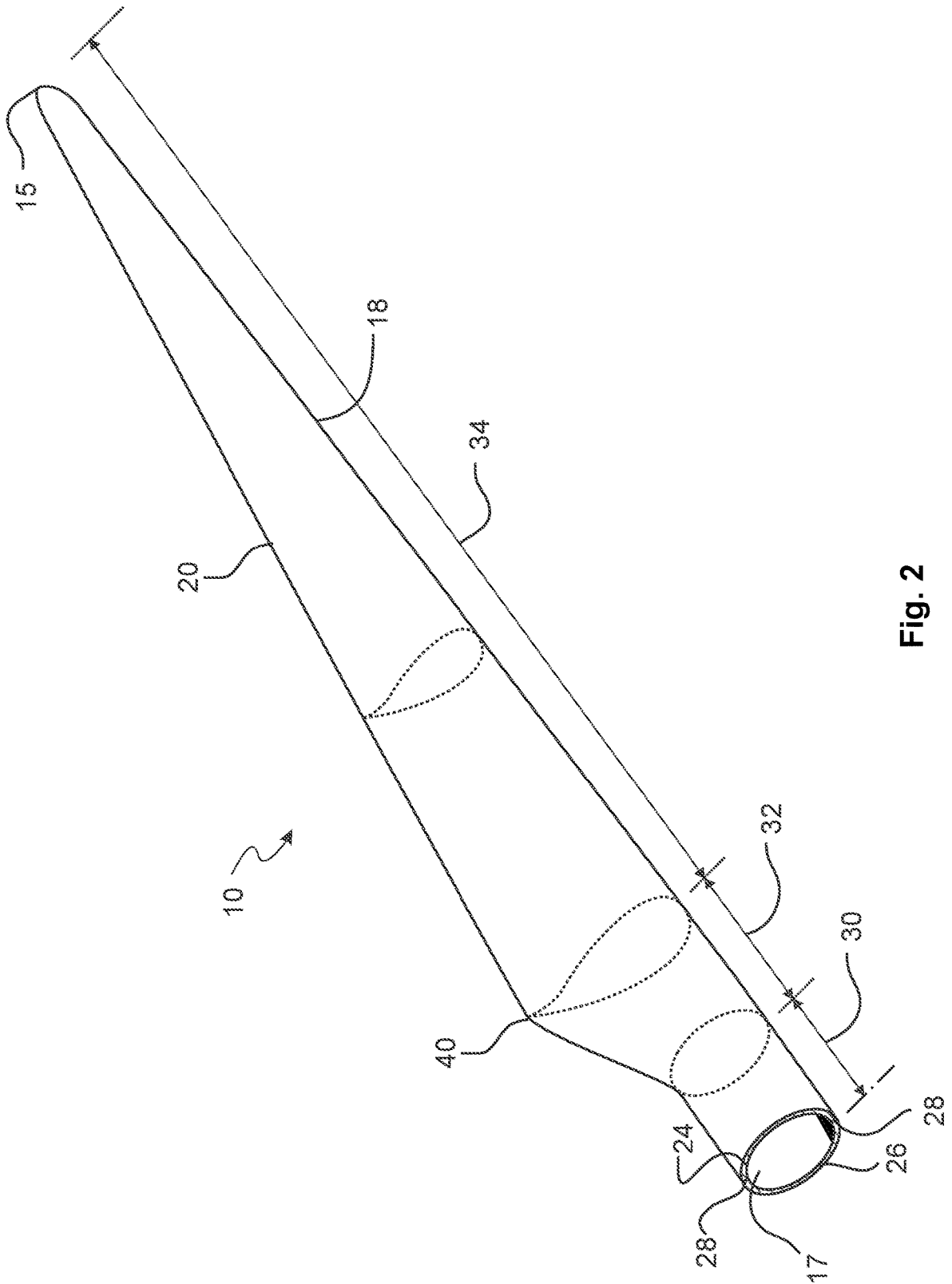
FIG. 2 shows a schematic view of an exemplary wind turbine blade.

FIG. 2 shows a schematic view of an exemplary wind turbine blade 10, such as a wind turbine blade 10 of the wind turbine 2 as illustrated in FIG. 1. The wind turbine blade 10 has the shape of a conventional wind turbine blade with a root end 17 and a tip end 15 and comprises a root region 30 closest to the hub, a profiled or airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell typically comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28, e.g. extending along the trailing edge 20 and the leading edge 18 of the blade 10. Typically, the root ends of the blade shell parts 24, 26 has a semi-circular or semi-oval outer cross-sectional shape.

Figure 3:
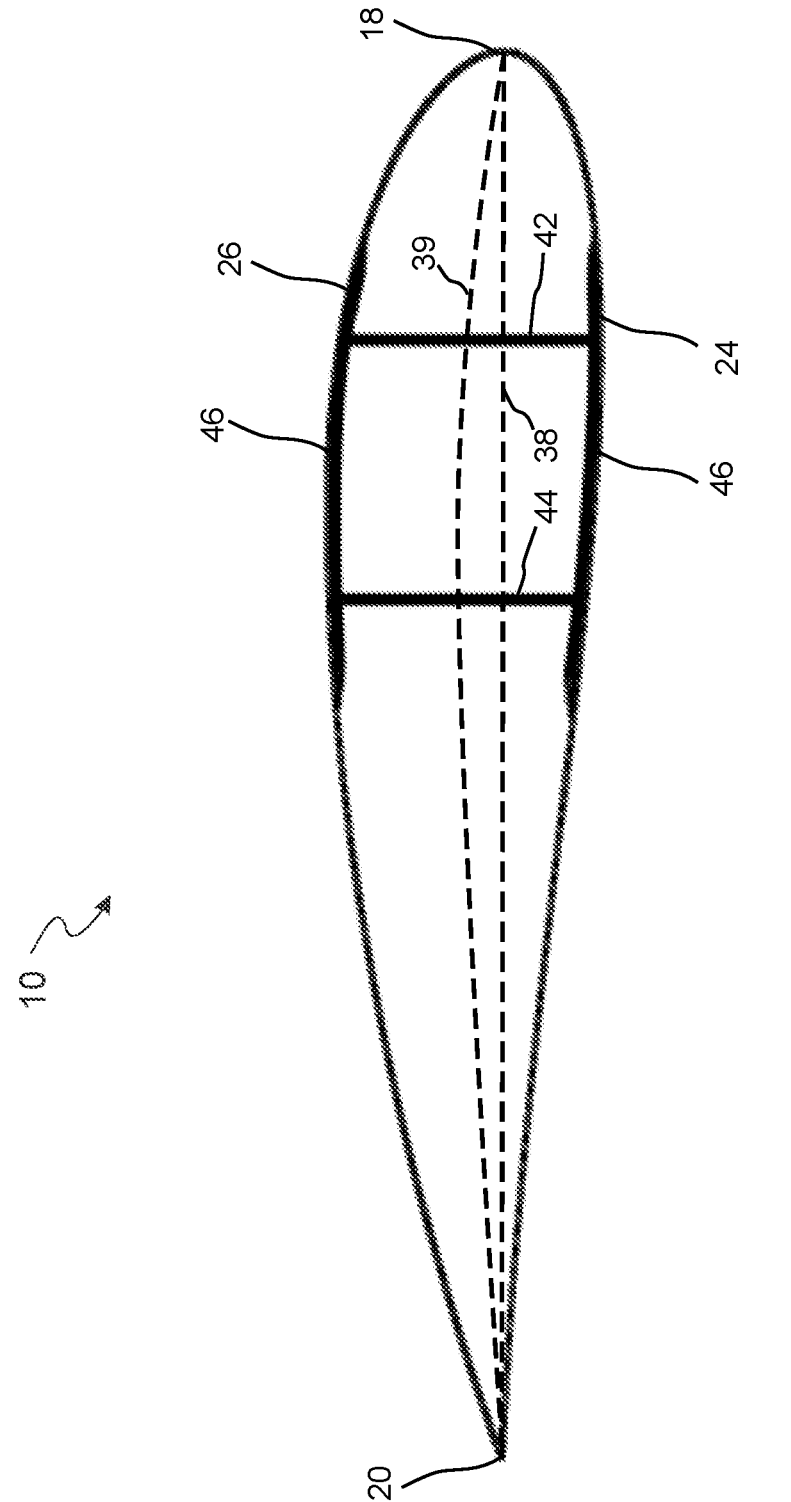
FIG. 3 is a schematic diagram illustrating a cross sectional view of an exemplary wind turbine blade.

FIG. 3 is a schematic diagram illustrating a cross sectional view of an exemplary wind turbine blade 10, e.g. a cross sectional view of the airfoil region of the wind turbine blade 10, such as the wind turbine blade 10 as described in relation to FIG. 2. The wind turbine blade 10 comprises a leading edge 18, a trailing edge 20, a pressure side 24, and a suction side 26. The wind turbine blade 10 further comprises two spar caps (sometimes also referred to as main laminates) 46, one being arranged towards the pressure side 24 and the other being arranged towards the suction side 26. The wind turbine blade 10 comprises a chord line 38 between the leading edge 18 and the trailing edge 20. Also, a blade median may be defined (also sometimes referred to as the camber line) between the pressure side 24 and the suction side 26 is illustrated. The blade median 39 is the median between the pressure side 24 and the suction side 26, measured perpendicular to the chord line 38. The blade median may be found by drawing inscribed circles from the leading edge 18 to the trailing edge 20. The blade median follows the centres of these inscribed circles.

The wind turbine blade 10 comprises shear webs, such as a leading edge shear web 42 and a trailing edge shear web 44. The shear webs 42, 44 extends between the pressure side 24 and the suction side 26 of the wind turbine blade 10, e.g. between the spar caps 46. The spar caps 46 may comprise carbon fibres. The shell parts 24, 26 may comprise glass fibres. The spar caps 46 may comprise pultruded elements, such as pultruded carbon fibre elements.

Figure 4:
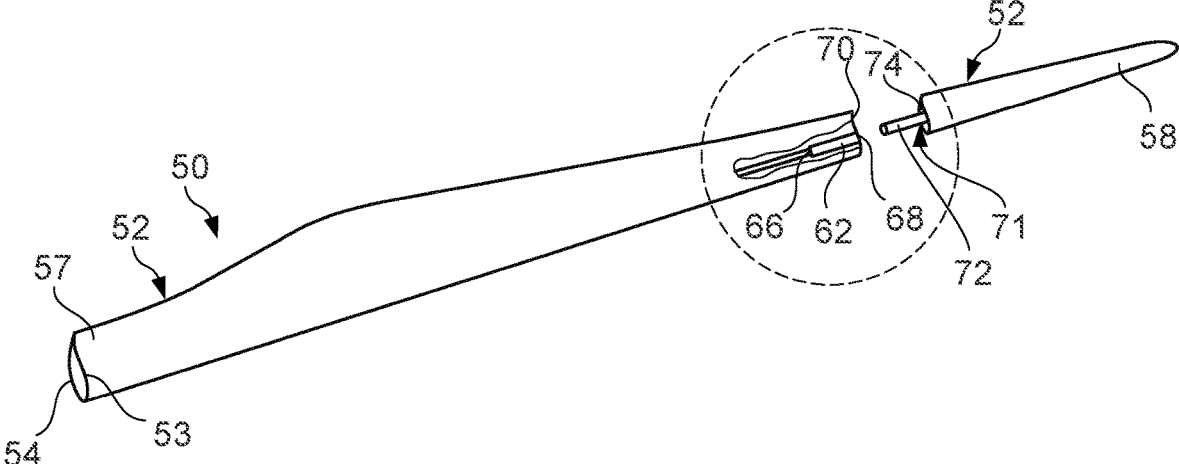
FIG. 4 shows a schematic diagram of a schematic cut-open view of an exemplary segmented wind turbine blade.
Figure 5:
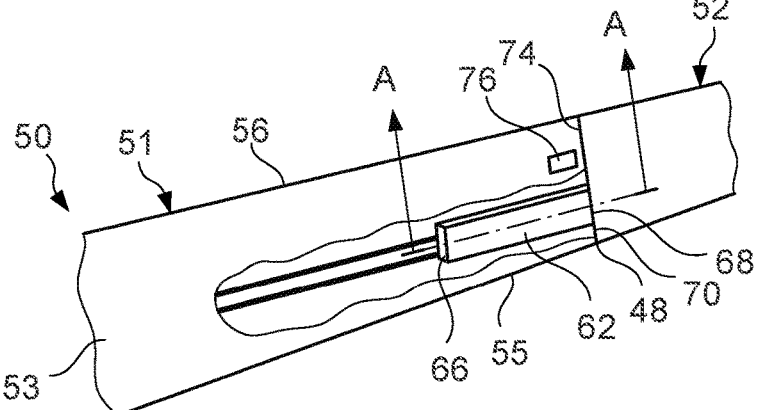
FIG. 5 is an enlarged view of the encircled section in FIG. 4 after segments of the segmented wind turbine blade have been joined.

Reference is now made to FIG. 4 and FIG. 5. FIG. 4 shows a schematic diagram of a schematic cut-open view of an exemplary segmented wind turbine blade 50 before joining a first blade segment 51 and a second blade segment 52 thereof. FIG. 5 is an enlarged view of the encircled section in FIG. 4 after the first and second blade segments 51, 52 of the segmented wind turbine blade 50 have been joined at a chord-wise joint 48. The wind turbine blade 10 of FIGS. 1-3 may be a segmented wind turbine blade, such as the wind turbine blade 50 as illustrated with reference to FIGS. 4 and 5.

Figures 6, 7:
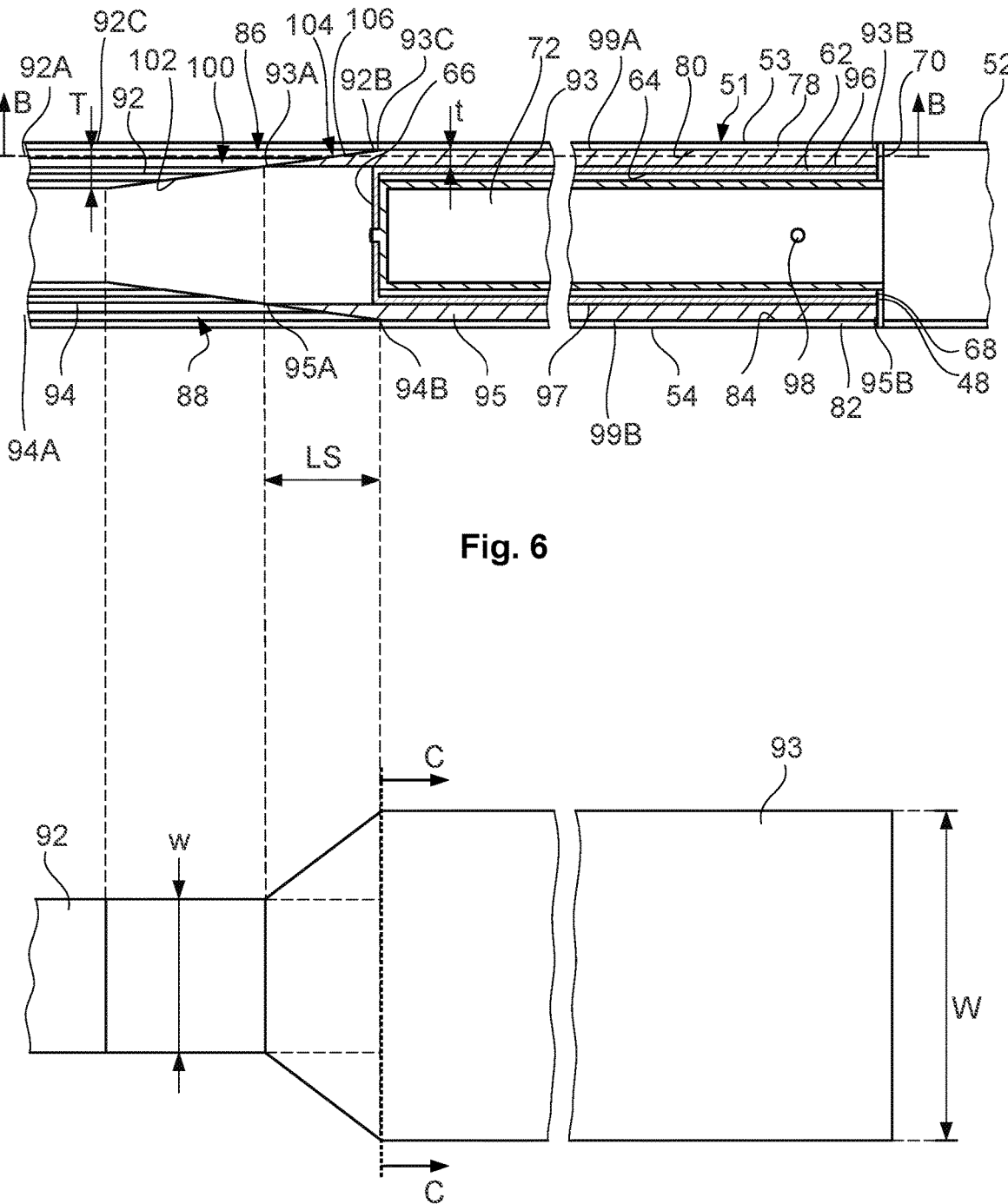
FIG. 6 is an enlarged sectional view along the line A-A in FIG. 5 of an exemplary assembly of the segmented wind turbine blade.
FIG. 7 is a sectional view along the line B-B in FIG. 6, FIG. 8 schematically illustrates an exemplary first secondary spar cap portion, and FIG. 9 schematically illustrates part of an exemplary spar cap.

Additionally, reference is made to FIG. 6 and FIG. 7, where FIG. 6 is an enlarged sectional view along the line A-A in FIG. 5 of an exemplary assembly of the segmented wind turbine blade 50 after the first and second blade segments 51, 52 thereof have been joined at the joint 48 and FIG. 7 is a sectional view along the line B-B in FIG. 6.

The segmented blade 50 comprises a first side 53 (e.g. a pressure side) with a first shell portion 78 and a second side 54 (e.g. a suction side) with a second shell portion 82 and a leading edge 55 and a trailing edge 56 and extends between a root end 57 and a tip end 58 as seen in a longitudinal direction of the blade. The above shell portions and segments thereof are typically manufactured by vacuum assisted resin transfer moulding (VARTM).

The first blade segment 51 comprises, in the illustrated example, the root end 57 of the blade 50 and can be considered the root end segment of the blade. The second blade segment 52 comprises, in the illustrated example, the tip end 58 of the blade 50 and can be considered the tip end segment of the blade.

The first blade segment 51 comprises a female spar part 62, which in some examples may have a substantially rectangular outer shape in a cross-sectional view. The female spar part 62 has an inner cavity, which may have a rectangular cross-sectional shape. The female spar part 62 has a longitudinal inner end 66 and an opposite longitudinal open end 68 towards an end face 70 of the first blade segment 51.

The second blade segment 52 comprises a male spar part 71 having a protruding portion 72 protruding at the joint 48 from an end face 74 of the second blade section 52 and into the cavity of the female spar part 62 to be received therein.

The segmented wind turbine blade 50 additionally comprises a locking mechanism for mutually locking the female spar part 62 and the protruding portion 72 of the male spar part 71 and thereby the first blade segment 51 and the second blade segment 52. The locking mechanism may comprise a pin joint 98 between the female 62 and male 71 spar parts. However, other means known in the art for restricting movement between the female 62 and male 71 spar parts may be used equivalently. The pin joint 98 may comprise an opening in the female spar part 62 and in the male spar part 71 and a pin extending through the opening, e.g. perpendicular to the longitudinal direction of the blade, such as to lock the female spart part 62 and the male spar part 71 together. The pin joint 98 may be accessible through an access opening 76 in the blade shell.

The first blade segment 51 comprises a first shell portion 78 having an inner surface 80 and a second shell portion 82 having an inner surface 84. A first spar cap 86 is connected to the inner surface 80 of a first shell portion 78 and extends longitudinally over at least a majority of the extent of the first blade segment 51. The first blade segment 51 comprises a second spar cap 88 connected to the inner surface 84 of the second shell portion 82 and extends longitudinally over at least a majority of the extent of the first blade segment 51.

The first spar cap 86 comprises a first primary spar cap portion 92. The second spar cap 88 comprises a second primary spar cap portion 94. The first primary spar cap portion 92 and/or the second primary spar cap portion 94 may preferably be made from a plurality of pultruded elements, e.g. pultruded carbon fibre elements.

The first primary spar cap portion 92 extends longitudinally from a first end 92A to an opposite second end 92B arranged near the female spar part 62. The second primary spar cap portion 94 extends longitudinally from a first end 94A to an opposite second end 94B arranged near the female spar part 62.

A first secondary spar cap portion 93 is affixed to a first outer surface 96 of the female spar part 62. A second secondary spar cap portion 95 is affixed to a second outer surface 97 of the female spar part 62. In some embodiments only one of the first secondary spar cap portion 93 and the second secondary spar cap portion 95 is provided. Affixing of the first secondary spar cap portion to the first outer surface of the female spar part and/or affixing of the second secondary spar cap portion to the second outer surface of the female spar part may be provided by gluing or may be provided by infusion of resin, e.g. in a vacuum assisted resin transfer moulding process (VARTM). Other methods known in the art may be used for affixing the first secondary spar cap portion to the first outer surface of the female spar part and/or affixing of the second secondary spar cap portion to the second outer surface of the female spar part.

The first secondary spar cap portion 93 extends longitudinally from a first end 93A to an opposite second end 93B arranged near the end face 70 of the first blade segment 51. The first secondary spar cap portion 93 is glued to the inner surface 80 of the first shell portion 78 forming a glue interface 99A between the first secondary spar cap portion 93 and the inner surface 80 of the first shell portion 78.

The second secondary spar cap portion 95 extends longitudinally from a first end 95A to an opposite second end 95B arranged near the end face 70 of the first blade segment 51. The second secondary spar cap portion 95 is glued to the inner surface 84 of the second shell portion 82 forming a glue interface 99B between the second secondary spar cap portion 95 and the inner surface 84 of the second shell portion 82.

The first secondary spar cap portion 93 and/or the second secondary spar cap portion 95 may be made from fibres, such a carbon fibres or glass fibres or a mixture of carbon and glass fibres. The first secondary spar cap portion 93 and/or the second secondary spar cap portion 95 may comprise a plurality of fibre layers, e.g. comprising carbon fibres, glass fibres or a mixture of carbon and glass fibres.

The first blade segment 51 may be manufactured by assembling the first shell portion 78 and the first primary spar cap portion 92, e.g. in a first blade shell mould. In some examples, the first primary spar cap portion 92 may have been pre-assembled and possibly infused with resin in a designated spar cap mould. The first shell portion 78 and the first primary spar cap portion 92 may be infused with a resin, e.g. using VARTM. Thereby, the first primary spar cap portion 92 is connected to the inner surface 80 of the first shell portion 78.

The first secondary spar cap portion 93 may be affixed to the first outer surface 96 of the female spar part 62, e.g. by infusion of resin, e.g. using VARTM. Alternatively, the first secondary spar cap portion 93 may be affixed to the first outer surface 96 by gluing or by use of other means known in the art.

After infusing the first shell portion 78 and the first primary spar cap portion 92 and after affixing the first secondary spar cap portion 93 to the first outer surface 96 of the female spar part 62, glue is supplied to the inner surface of the first shell portion, to the first primary spar cap and/or to the first secondary spar cap portion, and after supplying the glue the first shell portion 78 and the female spar part 62 with the affixed first secondary spar cap portion 93 are arranged as illustrated and described above and such that the first secondary spar cap portion 93 is glued to the inner surface 80 of the first shell portion 78 and/or to the first primary spar cap 92 forming a glue interface 99A between the first secondary spar cap portion 93 and the inner surface 80 of the first shell portion 78 and/or the first primary spar cap 92.

Furthermore, the second shell portion 82 and the second primary spar cap portion 94 may be assembled, e.g. in a second blade shell mould. In some examples, the second primary spar cap portion 94 may have been pre-assembled and possibly infused with resin in a designated spar cap mould. The second shell portion 82 and the second primary spar cap portion 94 may be infused with a resin, e.g. using VARTM. Thereby, the second primary spar cap portion 94 is connected to the inner surface 84 of the second shell portion 82.

The second secondary spar cap portion 95 may be affixed to the second outer surface 97 of the female spar part 62, e.g. by infusion of resin, e.g. using VARTM. For example, the first secondary spar cap portion 93, the second secondary spar cap portion 95 and the female spar part 62 may be infused together.

After infusing the second shell portion 82 and the second primary spar cap portion 94 and after affixing the second secondary spar cap portion 95 to the second outer surface 97 of the female spar part 62, glue is supplied to the inner surface of the second shell portion, to the second primary spar cap and/or to the second secondary spar cap portion, and after supplying the glue the second shell portion 82 and the female spar part 62 with the affixed second secondary spar cap portion 95 are arranged as illustrated and described above and such that the second secondary spar cap portion 95 is glued to the inner surface 84 of the second shell portion 82 and/or to the second primary spar cap 94 forming a glue interface 99B between the second secondary spar cap portion 95 and the inner surface 84 of the second shell portion 82 and/or the second primary spar cap 94. In some examples, arranging the second shell portion 82 and the female spar part 62 as described above may be done by closing of the wind turbine blade mould, i.e. by turning the second blade mould with the second shell portion 82 therein and positioning it over the first blade mould.

The first primary spar cap portion 92 may have a chordwise width w. The first primary spar cap portion 92 may have a uniform width w from the first end 92A to the second end 92B. The chordwise width w of the first primary spar cap portion 92, e.g. at its second end 92B may be less than a chordwise width W of the first secondary spar cap portion 93, e.g. at its second end 93B, as illustrated in FIG. 7. Similarly, the second primary spar cap portion 94 may have a chordwise width, e.g. the same as the chordwise width w of the first primary spar cap portion 92. The second primary spar cap portion 94 may have a uniform width from the first end 94A to the second end 94B. The chordwise width of the second primary spar cap portion 94, e.g. at its second end 94B may be less than a chordwise width of the second secondary spar cap portion 95, e.g. at its second end 95B.

The first primary spar cap portion 92 has a thickness T at an intermediate position 92C. In the illustrated example, the thickness of the first primary spar cap portion 92 decreases along the longitudinal direction in a transition area 100 of the first primary spar cap portion 92 from the intermediate position 92C to the second end 92B of the first primary spar cap portion. Similarly, in the present example, the thickness of the second primary spar cap portion 94 decreases along the longitudinal direction from an intermediate position to the second end 94B of the second primary spar cap portion 94. Thereby the first primary spar cap portion 92 and/or the second primary spar cap portion 94 may be provided with a tapering end face 102.

In the present example, the thickness T of the first primary spar cap portion 92 at its intermediate position 92C is more than a thickness t of the first secondary spar cap portion 93 at its first end 93A and/or at its second end 93B. Similarly, as illustrated, a thickness of the second primary spar cap portion 94 at its intermediate position may be more than a thickness of the second secondary spar cap portion 95 at its first end 95A and/or at its second end 95B.

The thickness of the first secondary spar cap portion 93 and/or the second secondary spar cap portion 95 may be substantially uniform along the longitudinal direction. However, in the illustrated example, the thickness t of the first secondary spar cap portion 93 is increasing along the longitudinal direction in a transition area 104 of the first secondary spar cap portion 93 from the first end 93A to an intermediate position 93C of the first secondary spar cap portion 93. Similarly, as also illustrated, the thickness of the second secondary spar cap portion 95 may be increasing along the longitudinal direction in a transition area of the first secondary spar cap portion 95 from the first end 95A to an intermediate position of the second secondary spar cap portion 95. Thereby the first secondary spar cap portion 93 and/or the second secondary spar cap portion 95 may be provided with a tapering end face 106. The tapering end face 106 of the first secondary spar cap portion 93 may be adapted for being joined with the tapering end face 102 of the first primary spar cap portion 92, as illustrated, and similarly, the tapering end face of the second secondary spar cap portion 95 may be adapted for being joined with the tapering end face of the second primary spar cap portion 94, as illustrated. The intermediate position 93C of the first secondary spar cap portion 93 is longitudinally aligned with the second end 92B of the first primary spar cap portion 92. Similarly, the intermediate position of the second secondary spar cap portion 95 is longitudinally aligned with the second end 94B of the second primary spar cap portion 94. Thereby, scarf joints between the first primary spar cap portion 92 and the first secondary spar cap portion 93 and between the second primary spar cap portion 94 and the second secondary spar cap portion 95, are provided.

The intermediate position 92C of the first primary spar cap portion 92 may be longitudinally aligned with the first end 93A of the first secondary spar cap portion 93. However, in the present example, the first end 93A of the first secondary spar cap portion 93 is aligned between the intermediate position 92C and the second end 92B of the first primary spar cap portion to account for the difference in thickness. Similarly, the intermediate position 94C of the second primary spar cap portion 94 may be longitudinally aligned with the first end 95A of the second secondary spar cap portion 95, while in the present example, the first end 95A of the second secondary spar cap portion 95 is aligned between the intermediate position 94C and the second end 94B of the second primary spar cap portion.

The length of the tapering end face 102 of the first primary spar cap portion 92 and/or the second primary spar cap portion 94 may be longer than the length of the tapered end face 106 of the first secondary spar cap portion 93 and/or the second secondary spar cap portion 95 in order to reduce the thickness of the first primary spar cap portion 92 and/or the second primary spar cap portion 94 forming a part of the scarf connection. In the illustrated scarf connection the tapered end face 106 of the first secondary spar cap portion 93 and the second secondary spar cap portion 95 overlaps a respective portion of the tapered end face 102 of the first primary spar cap portion 92 and the second primary spar cap portion 94, and the end faces are mutually connected in the overlap providing a thickness of the scarf connection corresponding essentially to the thickness t of the first secondary spar cap portion 93 and second secondary spar cap portion 95. Glue is advantageously provided in the scarf connection between tapered end faces 102, 106. Thereby a glue interface is provided between the first secondary spar cap portion 93 and the first primary spar cap portion 92, such as between the tapered end faces 102, 106 thereof. Similarly, a glue interface may be provided between the second secondary spar cap portion 95 and the second primary spar cap portion 94, such as between the tapered end faces thereof.

The taper of the overlap of the mutually connected tapered end faces defines the taper of the scarf connection. The length of the overlap defines the length LS of the longitudinally extending scarf connection. The longitudinally extending scarf connection may partially overlap the longitudinal inner end 66 of the female spar part 62 in the longitudinal direction of the blades, or adjoins the longitudinal inner end 66 of the female spar part 62 in the longitudinal direction of the blades, as illustrated, or may be spaced from the longitudinal inner end 66 of the female spar part 62 in the longitudinal direction of the blades. Spacing between the longitudinally extending scarf connection and the inner end of the female spar part can be 0 to 12 meters, such as 0 to 10 meters or 0 to 8 meters or 0 to 5 meter or 0 to 3 meters. It should be noted that the taper of the scarf connection shown in the drawings is larger than for a real wind turbine blade where the taper typically is 1:5 to 1:200.

The first primary spar cap portion 92 and the second primary spar cap portion 94 has, in the present example, a thickness T being approximately twice the thickness t of the first secondary spar cap portion 93 and the second secondary spar cap portion 95. Corresponding to the above gradual reduction of the thickness in the transition region the width of the first secondary spar cap portion 93 and of the second secondary spar cap portion 95 are, starting at the first end 93A, 95A, gradually increased from a width essentially corresponding to the width w of the first primary spar cap portion 92 and the second primary spar cap portion 94 to a larger width W in order to obtain sufficient strength of the first secondary spar cap portion 93 and the second secondary spar cap portion 95. In the present example the width W at the second end 93B, 95B of the first secondary spar cap portion 93 and of the second secondary spar cap portion 95 is approximately twice the width of the first primary spar cap portion 92 and the second primary spar cap portion 94.

Figure 8:
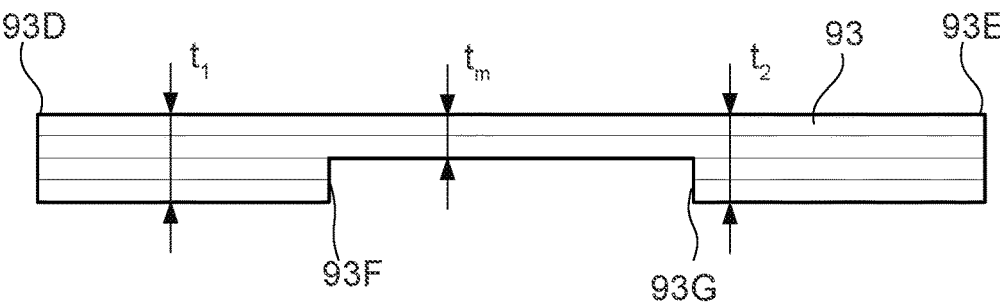

FIG. 8 schematically illustrates an exemplary first secondary spar cap portion 93, as seen in the longitudinal direction as indicated by line C-C in FIG. 7. In some examples, the thickness of the first secondary spar cap portion 93 may be uniform in the chordwise direction at a longitudinal position of the first secondary spar cap portion 93. However, alternatively, as illustrated in FIG. 8, the thickness of the first secondary spar cap portion 93 at a longitudinal position, such as at the intermediate position 93C, the first end 93A, or the second end 93B, the thickness of the first secondary spar cap portion 93 may vary along the chordwise direction. For example, as illustrated in FIG. 8, the first secondary spar cap portion 93 has a first thickness t1 between a first edge 93D and a first midpoint 93F along the chordwise direction, has a second thickness t2 between a second edge 93E and a second midpoint 93G along the chordwise direction, and has a midpart thickness tm between the first midpoint 93F and the second midpoint 93G. Thus, the first secondary spar cap portion 93 may be thicker between the first edge 93D and the first midpoint 93F and between the second edge 93E and the second midpoint 93G than between the first midpoint 93F and the second midpoint 93G. In some examples the thickness may vary along the chordwise direction throughout the entire length of the spar cap portion, in other examples the thickness may vary only at certain parts of the spar cap portion. The varying of the thickness along the chordwise direction allows the first secondary spar cap portion 93 to attach to the inner surface 80 of the first shell portion 78 also on the sides of the first primary spar cap portion 92. Thus allowing for an enhanced connection to the inner surface 80 as well as allowing for the first secondary spar cap portion 93 to be wider. Although FIG. 8 is described with respect to the first secondary spar cap portion 93, it should be understood that the second secondary spar cap portion 95 of the previous figures may be similarly shaped with or without a varying thickness.

Figure 9:
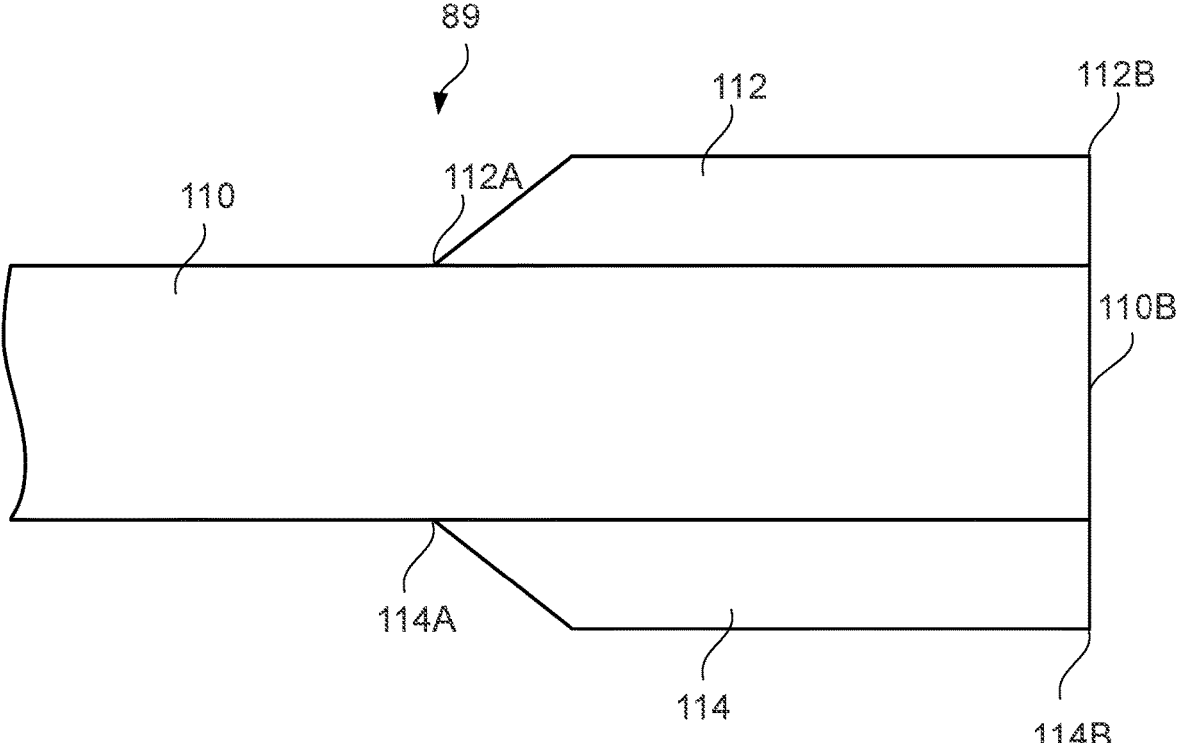

FIG. 9 schematically illustrates part of an exemplary spar cap 89, such as a variation of the first spar cap 86 and the second spar cap 88 of the previous figures, wherein the spar cap 89 comprises a tertiary spar cap portion 112 and a quaternary spar cap portion 114 in addition to the primary spar cap portion 110, which corresponds to the first primary spar cap portion 92 and/or the second primary spar cap portion 94 as described previously. The primary spar cap portion 110, the tertiary spar cap portion 112 and/or the quaternary spar cap portion 114 may be made from one or more pultruded elements, e.g. pultruded carbon fibre elements.

The primary spar cap portion 110 is in the chordwise direction arranged between the tertiary spar cap portion 112 and the quaternary spar cap portion 114. Each of the tertiary spar cap portion 112 and the quaternary spar cap portion 114 extends longitudinally from a respective first end 112A, 114A to an opposite second end 112B, 114B. The second ends 110B, 112B, 114B are to be arranged near the female spar part. The second ends 110B, 112B, 114B of the primary spar cap portion 110, the tertiary spar cap portion 112B and the quaternary spar cap portion 114B are longitudinally aligned. The primary spar cap portion 110 is longer than each of the tertiary spar cap portion 112 and the quaternary spar cap portion 114.

The primary spar cap portion 110, the tertiary spar cap portion 112, and the quaternary spar cap portion 114 may be infused with the resin together with the respective shell portion in which it is to be connected, thereby connecting the primary spar cap portion 100, the tertiary spar cap portion 112, and the quaternary spar cap portion 114 to the inner surface of the respective shell portion.

The primary spar cap portion 110, the tertiary spar cap portion 112, and the quaternary spar cap portion 114 may be tapered towards their second ends 110B, 112B, 114B, such as described with respect to the first primary spar cap portion 92 and the second primary spar cap portion 94 as described previously.

By providing the tertiary spar cap portion 112 and the quaternary spar cap portion 114 on each side of the primary spar cap portion 110, the spar cap is made wider thereby facilitating it to be thinner towards the second ends 110A, 112B, 114B while being able to withstand the same load and allowing space for the female spar part.

The female spar part with an affixed secondary spar cap portion, such as the first secondary spar cap portion 93 or the second secondary spar cap portion 95, as illustrated in previous figures, may be arranged near the second ends 110B, 112B, 114B, e.g. such that the secondary spar cap portion is glued to the primary spar cap portion 110, the tertiary spar cap portion 112, and the quaternary spar cap portion 114 forming a glue interface between the secondary spar cap portion and the primary spar cap portion 110, the tertiary spar cap portion 112, and the quaternary spar cap portion 114. The female spar part with the affixed secondary spar cap portion may be arranged such as to overlap with the second ends 110B, 112B, 114B, e.g. to form a scarf joint as explained in relation to the previous figures.

The disclosure has been described with reference to a preferred embodiment. However, the scope of the invention is not limited to the illustrated embodiment, and alterations and modifications can be carried out without deviating from the scope of the invention.

Throughout the description, the use of the terms "first", "second", "third", "fourth", "primary", "secondary", "tertiary" etc. does not imply any particular order or importance, but are included to identify individual elements. Furthermore, the labelling of a first element does not imply the presence of a second element and vice versa.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
38 chord line
39 blade median
40 shoulder
42 leading edge shear web
44 trailing edge shear web
46 spar cap
48 joint
50 segmented wind turbine blade
51 first blade segment
52 second blade segment
53 first side
54 second side
55 leading edge
56 trailing edge
57 root end
58 tip end
62 female spar part
64 inner cavity
66 longitudinal inner end
68 longitudinal open end
70 end face of first blade segment
71 male spar part
72 protruding portion of male spar part
74 end face of second blade segment
76 access opening
78 first shell portion 80 inner surface of first shell portion
82 second shell portion
84 inner surface of second shell portion
86 first spar cap
88 second spar cap
92 first primary spar cap portion
93 first secondary spar cap portion
94 second primary spar cap portion
95 second secondary spar cap portion
96 first outer surface of the female spar part
97 second outer surface of the female spar part
98 pin joint
99A, 99B glue interface
100, 104 transition area
102, 106 tapering end face
110 tertiary spar cap portion
112 quaternary spar cap portion

The invention claimed is:

1. A segmented wind turbine blade having a profiled contour including a pressure side and a suction side, and a leading edge and a trailing edge with a chord extending therebetween defining a chordwise direction, the segmented wind turbine blade extending in a longitudinal direction between a root end and a tip end and comprises:

a first blade segment comprising a female spar part defining an inner cavity and having a longitudinal inner end and an opposite longitudinal open end towards an end face of the first blade segment;

a second blade segment connected to the first blade segment at a chordwise joint and comprising a male spar part having a protruding portion protruding at the joint from an end face of the second blade segment and extending through the longitudinal open end of the female spart part and into the cavity of the female spar part, wherein the first blade segment further comprises, a first spar cap connected to an inner surface of a first shell portion of the first blade segment and extending longitudinally over at least a majority of the extent of the first blade segment, the first spar cap comprises a first primary spar cap portion, the first primary spar cap portion being connected to the inner surface of the first shell portion by infusion of resin; and a second spar cap connected to an inner surface of a second shell portion of the first blade segment and extending longitudinally over at least a majority of the extent of the first blade segment, the second spar cap comprises a second primary spar cap portion, wherein a first secondary spar cap portion is affixed to a first outer surface of the female spar part by infusion of resin, the first secondary spar cap portion extending longitudinally from a first end to an opposite second end arranged near the end face of the first blade segment, and wherein the first secondary spar cap portion is glued to the inner surface of the first shell portion and/or to the first primary spar cap portion forming a glue interface between the first secondary spar cap portion and the inner surface of the first shell portion and/or the first primary spar cap portion, and wherein the first secondary spar cap portion, at a longitudinal position of the first secondary spar cap portion, is thicker between a first edge and a first midpoint along the chordwise direction and between a second edge and a second midpoint along the chordwise direction than between the first midpoint and the second midpoint.

2. The segmented wind turbine blade according to claim 1, wherein a second secondary spar cap portion is affixed to a second outer surface of the female spar part, the second outer surface being opposite the first outer surface, the second secondary spar cap portion extending longitudinally from a first end to an opposite second end arranged near the end face of the first blade segment, and wherein the second secondary spar cap portion is glued to the inner surface of the second shell portion and/or to the second primary spar cap portion forming a glue interface between the second secondary spar cap portion and the inner surface of the second shell portion and/or the second primary spar cap portion.

3. The segmented wind turbine blade according to claim 1, wherein the first primary spar cap portion and/or the second primary spar cap portion is made from a plurality of pultruded elements.

4. The segmented wind turbine blade according to claim 1, wherein the first primary spar cap portion extends longitudinally from a first end to an opposite second end arranged near the female spar part, and wherein a chordwise width of the first primary spar cap portion at its second end is less than a chordwise width of the first secondary spar cap portion at its second end.

5. The segmented wind turbine blade according to claim 1, wherein the first primary spar cap portion extends longitudinally from a first end to an opposite second end arranged near the female spar part, and wherein a thickness of the first primary spar cap portion decreases along the longitudinal direction in a transition area of the first primary spar cap portion from an intermediate position to the second end of the first primary spar cap portion, and wherein the thickness of the first primary spar cap portion at its intermediate position is more than a thickness of the first secondary spar cap portion at its first end and/or at its second end.

6. The segmented wind turbine blade according to claim 1, wherein the thickness of the first secondary spar cap portion is increasing along the longitudinal direction in a transition area of the first secondary spar cap portion from the first end to an intermediate position of the first secondary spar cap portion.

7. The segmented wind turbine blade according to claim 6, wherein the intermediate position of the first secondary spar cap portion is longitudinally aligned with the second end of the first primary spar cap portion, and wherein the intermediate position of the first primary spar cap portion is longitudinally aligned with the first end of the first secondary spar cap portion.

8. The segmented wind turbine blade according to claim 1, wherein the first secondary spar cap portion and/or the second secondary spar cap portion comprise a plurality of fibre layers, and wherein the plurality of fibre layers comprise glass fibre, carbon fibre or a mixture of glass fibre and carbon fibre.

9. A method for manufacturing a first blade segment with a female spar part for receiving a protruding portion of a male spar part of a second blade segment for connection with the first blade segment at a chordwise joint for forming a segmented wind turbine blade having a profiled contour including a pressure side and a suction side, and a leading edge and a trailing edge with a chord extending therebetween defining a chordwise direction, the segmented wind turbine blade extending in a longitudinal direction between a root end and a tip end, the method comprising:

assembling a first shell portion and a first primary spar cap portion of a first spar cap;

infusing the first shell portion and the first primary spar cap portion with a resin connecting the first primary spar cap portion to an inner surface of the first shell portion;

providing the female spar part defining an inner cavity and having a longitudinal inner end and an opposite longitudinal open end towards an end face of the first blade segment;

affixing a first secondary spar cap portion to a first outer surface of the female spar part;

after infusing the first shell portion and the first primary spar cap portion supplying glue to the inner surface of the first shell portion, to the first primary spar cap, and/or to the first secondary spar cap portion;

after supplying the glue arranging the first shell portion and the female spar part with the affixed first secondary spar cap portion such that the longitudinal open end of the female spar part is arranged towards an end face of the first blade segment, and such that the first secondary spar cap portion is glued to the inner surface of the first shell portion and/or to the first primary spar cap forming a glue interface between the first secondary spar cap portion and the inner surface of the first shell portion and/or the first primary spar cap;

assembling a second shell portion and a second primary spar cap portion of a second spar cap;

infusing the second shell portion and the second primary spar cap portion with a resin connecting the second primary spar cap portion to an inner surface of the second shell portion;

affixing a second secondary spar cap portion to a second outer surface opposite the first outer surface of the female spar part;

after infusing the second shell portion and the second primary spar cap portion supplying glue to an inner surface of the second shell portion, to the second primary spar cap portion, and/or to the first secondary spar cap portion; and after supplying the glue, arranging the second shell portion and the female spar part with the affixed second secondary spar cap portion such that the second secondary spar cap portion is glued to the inner surface of the second shell portion and/or to the second primary spar cap forming a glue interface between the second secondary spar cap portion and the inner surface of the second shell portion and/or the second primary spar cap, wherein a second blade segment connects to the first blade segment at a chordwise joint and comprises the male spar part, the male spar part having a protruding portion protruding at the chordwise joint from an end face of the second blade segment and extending through the longitudinal open end of the female spart part and into the inner cavity of the female spar part, wherein the first spar cap extends longitudinally over at least a majority of the extent of the first blade segment, wherein the second spar cap extends longitudinally over at least a majority of the extent of the first blade segment, and wherein the first secondary spar cap portion, at a longitudinal position of the first secondary spar cap portion, is thicker between a first edge and a first midpoint along the chordwise direction and between a second edge and a second midpoint along the chordwise direction than between the first midpoint and the second midpoint.

10. The method according to claim 9, wherein assembling the first shell portion and the first primary spar cap portion includes assembling the first shell portion, the first primary spar cap portion, a first tertiary spar cap portion, and a first quaternary spar cap portion, wherein the first primary spar cap portion in the chordwise direction is arranged between the first tertiary spar cap portion and the first quaternary spar cap portion, and infusing the first shell portion and the first primary spar cap portion with a resin includes infusing the first shell portion, the first primary spar cap portion, the first tertiary spar cap portion, and the first quaternary spar cap portion with the resin connecting the first primary spar cap portion, the first tertiary spar cap portion, and the first quaternary spar cap portion to the inner surface of the first shell portion.

11. The method according to claim 10, wherein arranging the first shell portion and the female spar part with the affixed first secondary spar cap portion includes arranging the female spar part such that the first secondary spar cap portion is glued to the first tertiary spar cap portion, and the first quaternary spar cap portion forming a glue interface between the first secondary spar cap portion and the first tertiary spar cap portion, and the first quaternary spar cap portion.

12. The method according to claim 9, wherein affixing the first secondary spar cap portion to the first outer surface of the female spar part and/or affixing the second secondary spar cap portion to the second outer surface of the female spar part is provided by infusion of resin, e.g. in a vacuum assisted resin transfer moulding process (VARTM).

13. A first blade segment for a segmented wind turbine blade, the first blade segment having a profiled contour including a pressure side and a suction side, and a leading edge and a trailing edge with a chord extending therebetween defining a chordwise direction, the first blade segment extending in a longitudinal direction between a first end and a second end, the first blade segment comprising:

a female spar part defining an inner cavity and having a longitudinal inner end and an opposite longitudinal open end towards an end face of the first blade segment, the female spar part being adapted to receive a protruding portion of a male spar part of a second blade segment for connection with the first blade segment at a chordwise joint for forming the segmented wind turbine blade;

a first spar cap connected to an inner surface of a first shell portion of the first blade segment and extending longitudinally over at least a majority of the extent of the first blade segment, the first spar cap comprises a first primary spar cap portion, the first primary spar cap portion being connected to the inner surface of the first shell portion by infusion of resin, and a second spar cap connected to an inner surface of a second shell portion of the first blade segment and extending longitudinally over at least a majority of the extent of the first blade segment, the second spar cap comprises a second primary spar cap portion, wherein a first secondary spar cap portion is affixed to a first outer surface of the female spar part by infusion of resin, the first secondary spar cap portion extending longitudinally from a first end to an opposite second end arranged near the end face of the first blade segment, and wherein the first secondary spar cap portion is glued to the inner surface of the first shell portion and/or to the first primary spar cap portion forming a glue interface between the first secondary spar cap portion and the inner surface of the first shell portion and/or the first primary spar cap portion, and wherein the first secondary spar cap portion, at a longitudinal position of the first secondary spar cap portion, is thicker between a first edge and a first midpoint along the chordwise direction and between a second edge and a second midpoint along the chordwise direction than between the first midpoint and the second midpoint.

* * * * *